(12) United States Patent
Shepard et al.

(10) Patent No.: US 9,355,612 B1
(45) Date of Patent: May 31, 2016

(54) DISPLAY SECURITY USING GAZE TRACKING

(71) Applicant: Amazon Technologies, Inc., Reno, NV (US)

(72) Inventors: Isaac Jeremy Shepard, Ladera Ranch, CA (US); Timothy Lee Fowers, Lake Forest, CA (US); William Allan Dugan, Irvine, CA (US)

(73) Assignee: Amazon Technologies, Inc., Reno, NV (US)

( * ) Notice: Subject to any disclaimer, the term of this patent is extended or adjusted under 35 U.S.C. 154(b) by 280 days.

(21) Appl. No.: 13/746,888

(22) Filed: Jan. 22, 2013

(51) Int. Cl.
*G09G 5/00* (2006.01)
*G06F 3/01* (2006.01)

(52) U.S. Cl.
CPC .............. *G09G 5/006* (2013.01); *G06F 3/013* (2013.01); *G06F 2221/21* (2013.01); *G06F 2221/2133* (2013.01)

(58) Field of Classification Search
CPC ........ G06T 19/006; G09G 5/006; G06F 3/13; G06F 2221/2133; G06F 2221/21
USPC ........................................................ 345/633
See application file for complete search history.

(56) References Cited

U.S. PATENT DOCUMENTS

| 6,215,471 B1* | 4/2001 | DeLuca ....................... 345/158 |
| 7,469,071 B2* | 12/2008 | Drimbarean et al. ......... 382/254 |
| 7,940,285 B2* | 5/2011 | Would et al. .................. 345/637 |
| 2012/0210233 A1* | 8/2012 | Davis et al. ................... 715/727 |
| 2014/0201844 A1* | 7/2014 | Buck ...................... G06F 21/50 726/26 |

OTHER PUBLICATIONS

Manu Kumar, Tal Garfinkel, Dan Boneh, Terry Winograd, Reducing shoulder-surfing by using gaze-based password entry, Proceedings of the 3rd symposium on Usable privacy and security, Jul. 18-20, 2007, Pittsburgh, Pennsylvania, hereafter known as "Kumar".*

* cited by examiner

*Primary Examiner* — Barry Drennan
*Assistant Examiner* — Robert Craddock
(74) *Attorney, Agent, or Firm* — Polsinelli LLP

(57) ABSTRACT

A computing device can track a gaze direction of a user of the computing device. In some embodiments, gaze tracking can be performed using at least one front-facing camera of the computing device. The computing device can determine a position on a display of the device that corresponds to where the user's gaze is directed. The computing device can display content that is decipherable (i.e., readable, legible, recognizable, understandable, non-scrambled, unobscured, etc.) at the position on the display that corresponds to the user's gaze direction. The computing device can scramble at least some content that is displayed at a position(s) on the display other than the position at which the user's gaze is directed.

26 Claims, 14 Drawing Sheets

DISPLAY SECURITY USING GAZE TRACKING

BACKGROUND

Computing devices are becoming more commonplace and are used for a wide variety of purposes. A computing device can be used to view content, such as images, text, animation, or webpages. A user of the computing device typically views the content via a display of the computing device. The user typically looks at the display and has little or no knowledge about whether or not there are other people looking at the content on the display of the computing device. For example, on a plane ride, the user generally would not know whether or not the person sitting behind the user is viewing the content displayed on the user's computing device. In some cases, the content can be private, confidential, or sensitive in nature, such that it would be undesirable to the user for another person to view the content without permission from the user. Insecure viewing of content can take away from the overall user experience associated with using computing devices.

BRIEF DESCRIPTION OF THE DRAWINGS

Various embodiments in accordance with the present disclosure will be described with reference to the drawings, in which.

DETAILED DESCRIPTION

Figure 1:
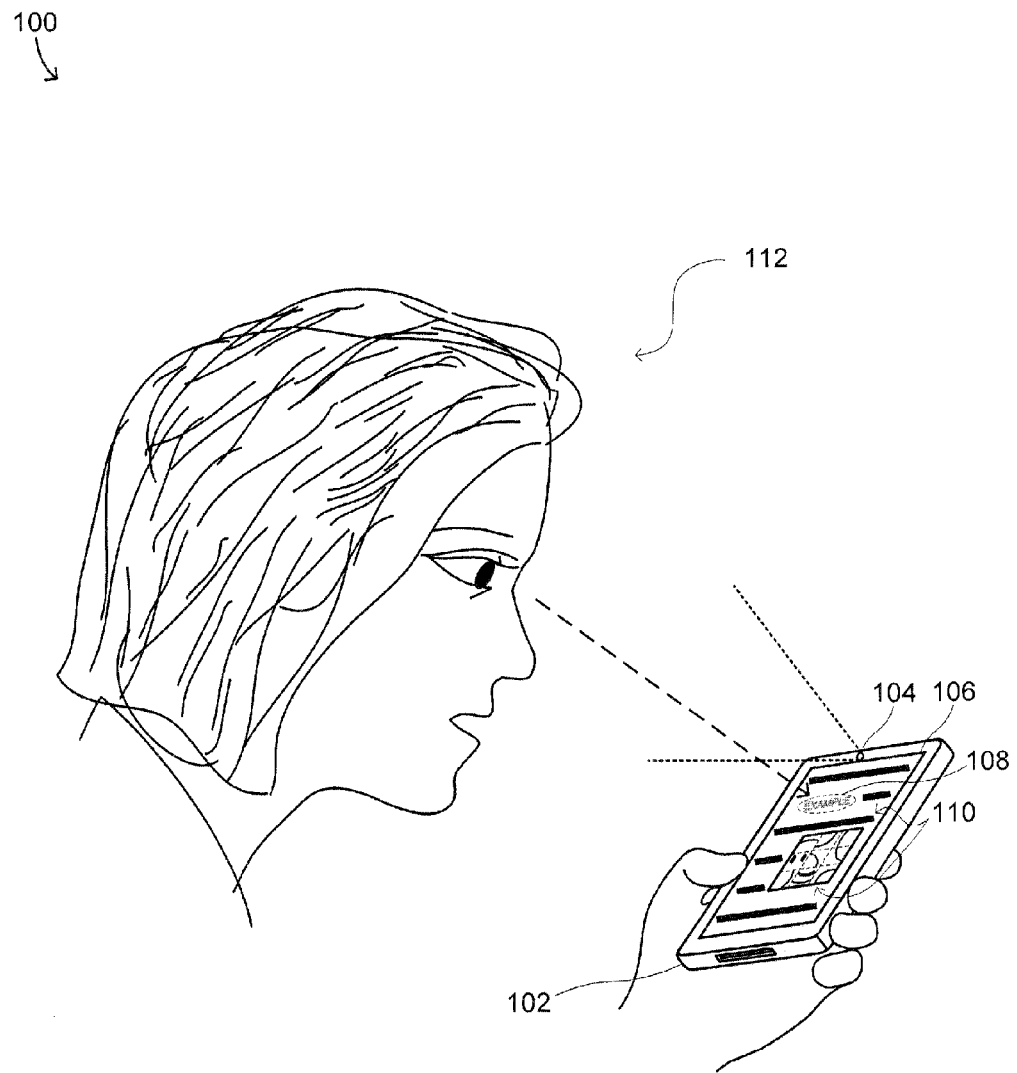
FIG. 1 illustrates an example environment in which aspects of the various embodiments can be utilized.

Systems and methods in accordance with various embodiments of the present disclosure overcome one or more of the above-referenced and other deficiencies in conventional approaches to display security and privacy. In particular, various embodiments of the present disclosure can provide an approach to scrambling, obscuring, or otherwise modifying a display of content presented using a computing device, as may be based at least in part upon determining a gaze direction of a user of the computing device.

At least some embodiments enable a computing device to use a camera to capture images including at least a portion of the head, face, and/or a facial feature (e.g., eye) of the user of the computing device. Based at least in part on the images, the computing device can determine and/or track a gaze direction of the user. The computing device can also calculate or determine a position relative to a display of the device that corresponds to where the user's gaze is directed. The computing device can display content that is decipherable (i.e., readable, legible, recognizable, understandable, non-scrambled, unobscured, etc.) at the position on the display that corresponds to the user's gaze direction, as well as potentially a region or area around that direction. The device can scramble, obscure, or otherwise modify a presentation of at least some content that is displayed at a position on the display other than the position at which the user's gaze is directed, such as more than a threshold distance away or outside a region associated with the user's gaze direction.

In some embodiments, the device can scramble a presentation of content by at least in part censoring, blurring, distorting, concealing, animating, rotating, mirroring, and/or changing a polarization(s) associated with at least a portion of the content. Moreover, in some embodiments, the device can scramble the presentation of the content by applying a filter to the at least the portion of the content and/or applying an image processing algorithm to the at least the portion of the content. However, a person other than the user can potentially still recognize with relative ease that the unscrambled (portion(s) of the) content corresponds to content that is not censored, blurred, distorted, or concealed, etc. As such, in some embodiments, text content outside the unscrambled region can be scrambled by rearranging, replacing, and/or otherwise modifying characters of the text. This way, a person other than the user would have more difficulty in determining which (portion(s) of) content is readily decipherable. Similarly, in some embodiments, image content can be scrambled by separating the image content into pieces and rearranging the layout of the pieces of the image content. It is further contemplated that there can be many other scrambling techniques and implementations associated with the various embodiments of the present disclosure that a person having ordinary skill in the art would recognize.

Various other functions and advantages are described and suggested below as may be provided in accordance with the various embodiments.

FIG. 1 illustrates an example environment 100 in which aspects of the various embodiments can be utilized. The example environment 100 can include a computing device 102 and a user 112 of the computing device 102. The computing device 102 can comprise at least one camera 104. The computing device 102 can also have a display 106, such as a touch display screen. The display 106 can be configured to display various content, which can include (but is not limited to) pictures, text, video, documents, three-dimensional renderings, video game content, webpages, etc., and/or any combinations thereof. The content can be viewable to the user 112, but in some cases, unauthorized personnel can also be able to see the display 106 and the content. For example, a person (e.g., interloper or unauthorized personnel) can look over the back shoulders of the user 112 to see the content displayed on the display 106 of the computing device 102, which can be undesirable to the user 112. In some cases, the content can include confidential, private, and/or sensitive material, which would be especially undesirable to the user 112 if someone was to view the content without the user's authorization.

Various embodiments of the present disclosure enable the computing device 102 to track the gaze direction of the user 112 and provide display security using the tracked gaze direction of the user 112. In some embodiments, the computing device 102 can use the at least one camera 104, such as at least one front-facing camera, to track the gaze direction of the user 112. The at least one camera 104 can be configured to capture one or more images (e.g., still pictures, video image frames, etc.) that include a user feature(s), such as the head, face, and/or a facial feature (e.g., eyes) of the user 112. The one or more images including a feature(s) (e.g., the head, face, and/or facial feature, etc.) of the user 112 can be utilized by the computing device to determine or track the gaze direction of the user 112.

Based on the gaze direction of the user 112, the computing device 102 can determine an area 108 on the display 106 to which the gaze direction of the user 112 corresponds. As shown in FIG. 1, the area 108 at which the gaze of the user 112 is directed (i.e., an area within a threshold distance of the user's gaze, a region associated with the user's gaze, etc.) can be made decipherable (e.g., readable, legible, unobscured, etc.) by the device 102, while other areas 110 (i.e., an area(s) more than a threshold distance away, an area(s) outside the region associated with the user's gaze, etc.) are visually scrambled (e.g., distorted, disordered, concealed, censored, etc.). Moreover, various types of content can be scrambled. In the example of FIG. 1, text and/or images can be scrambled. Furthermore, content being displayed can be scrambled in various ways or manners, some examples of which are discussed in more detail below.

Figure 2A:
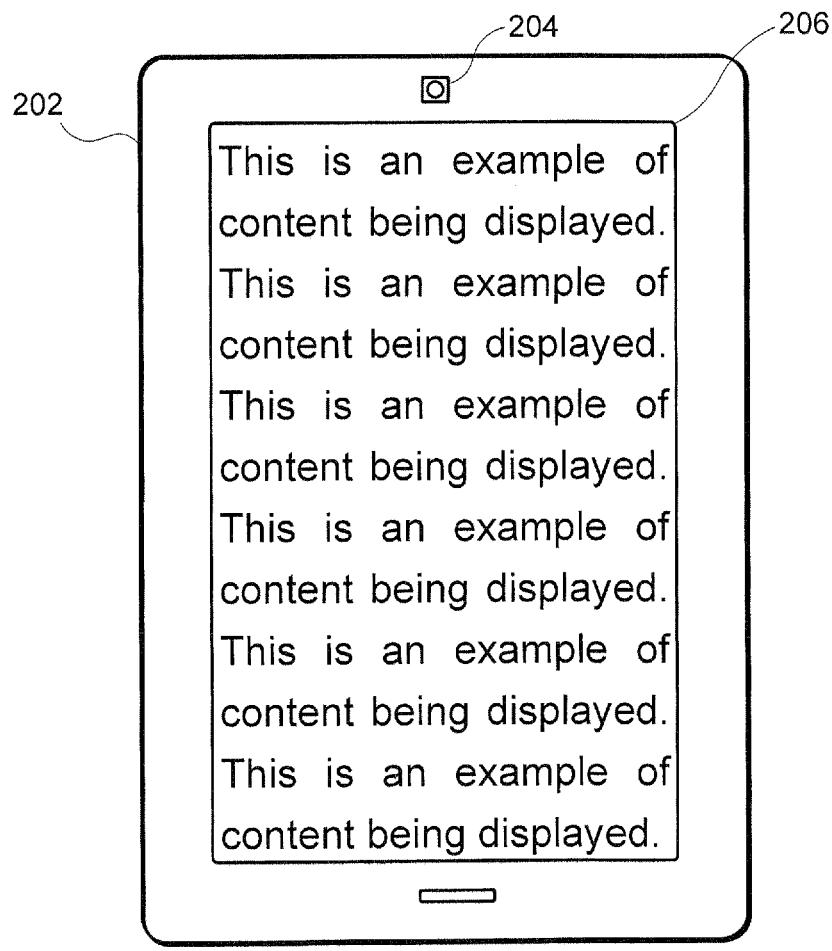
FIG. 2A illustrates an example device embodiment for display security for text content using gaze tracking.

FIG. 2A illustrates an example device embodiment 202 for display security for text content using gaze tracking. As shown in FIG. 2A, the example computing device embodiment 202 can comprise a camera 204 and a display 206. The camera 204 can be configured to facilitate in tracking the gaze direction of a user of the computing device embodiment 202. The display 206 can be configured to display content, such as text.

In FIG. 2A, the example text content as displayed by the computing device 202 can be decipherable (e.g., readable, legible, understandable, etc.) to the user of the device 202. However, a person other than the user may also be able to see the display 206 and be able to view and decipher the content. As such, the computing device can implement a form of scrambling (e.g., encoding, encrypting, obscuring, concealing, etc.) with respect to the content displayed such that the user can still view the content with relative ease but with the reduced likelihood that other people (e.g., unauthorized personnel) would be able to easily view the content, as discussed in more detail with reference to FIG. 2B.

Figure 2B:
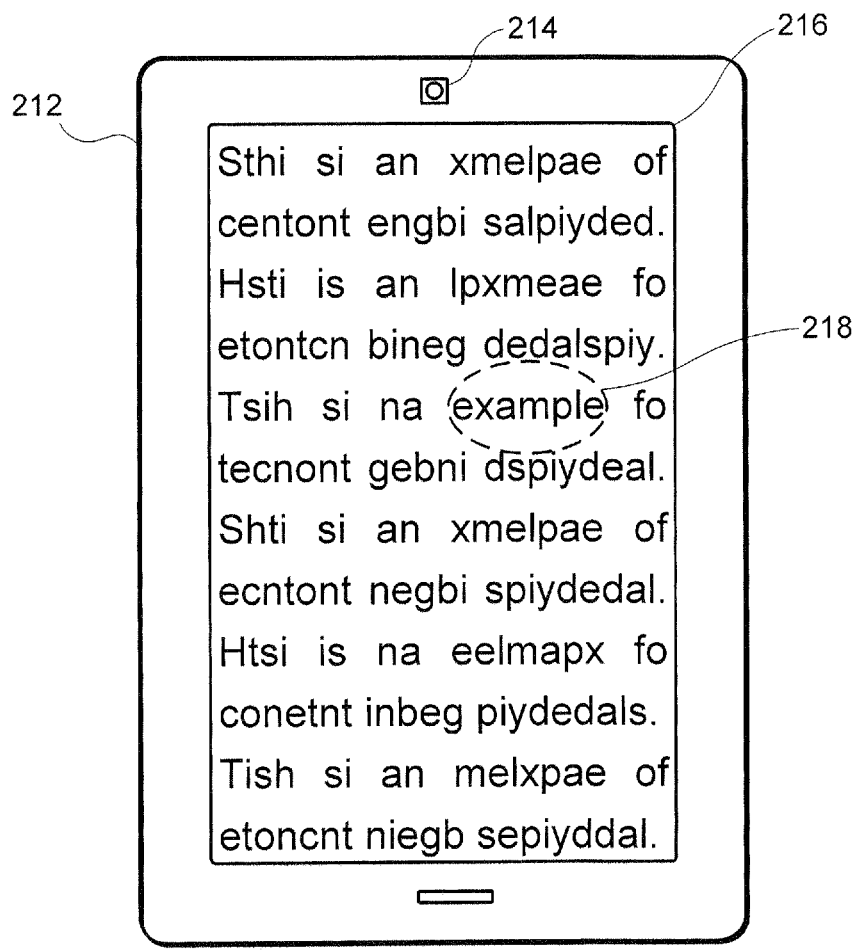
FIG. 2B illustrates an example device embodiment for display security for text content using gaze tracking.

FIG. 2B illustrates an example device embodiment 212 for display security for text content using gaze tracking. The example text content displayed via a display 216 of the example device 212 can be scrambled. In some embodiments, the scrambling of text content can include mixing up the letters, numbers, characters, symbols, etc., in words of the text. For example, the characters in each word in the text can be mixed up. As shown in FIG. 2B, the majority of the content displayed is not readily decipherable (i.e., readable, legible, etc.). As such, unauthorized personnel who see the content being displayed will have a more difficult time trying to understand the content.

However, various embodiments of the present disclosure can still enable the user of the computing device 212 to view and decipher (e.g., read, understand, etc.) the content. In some embodiments, the computing device 212 can use, at least in part, at least one camera 214 to capture an image(s) including the head, face, and/or a facial feature(s) (e.g., eye) of the user. The image can be analyzed to determine/track the gaze of the user. The computing device 212 can detect if and when the user's gaze is directed at the display 216 of the device 212. The device 212 can also calculate and/or determine a position or area 218 on the display 216 at which the user's gaze is directed.

In some embodiments, the computing device 212 can display content that is decipherable (e.g., readable, legible, understandable, non-scrambled, etc.) at the position or area 218 on the display 216 corresponding to where the user's gaze is directed. As the user changes or moves his/her gaze direction with respect to the display 216, the device 212 can calculate/determine and update the position or area 218 correspondingly, and display at the (updated) position or area 218 content that is decipherable.

For example, as shown in FIG. 2B, the device 212 can track the user's gaze and determine that the gaze is directed toward the particular position (or area) 218 on the display 216. The device 212 can display content that is decipherable at the particular position 218 while maintaining the scrambling of content displayed at other positions/areas. In other words, if content being displayed at a particular position/area on the display 216 is scrambled, then the device 212 can unscramble the content when the gaze direction of the user is directed to that particular position/area on the display 216. Content at other positions/areas can remain scrambled.

Figure 2C:
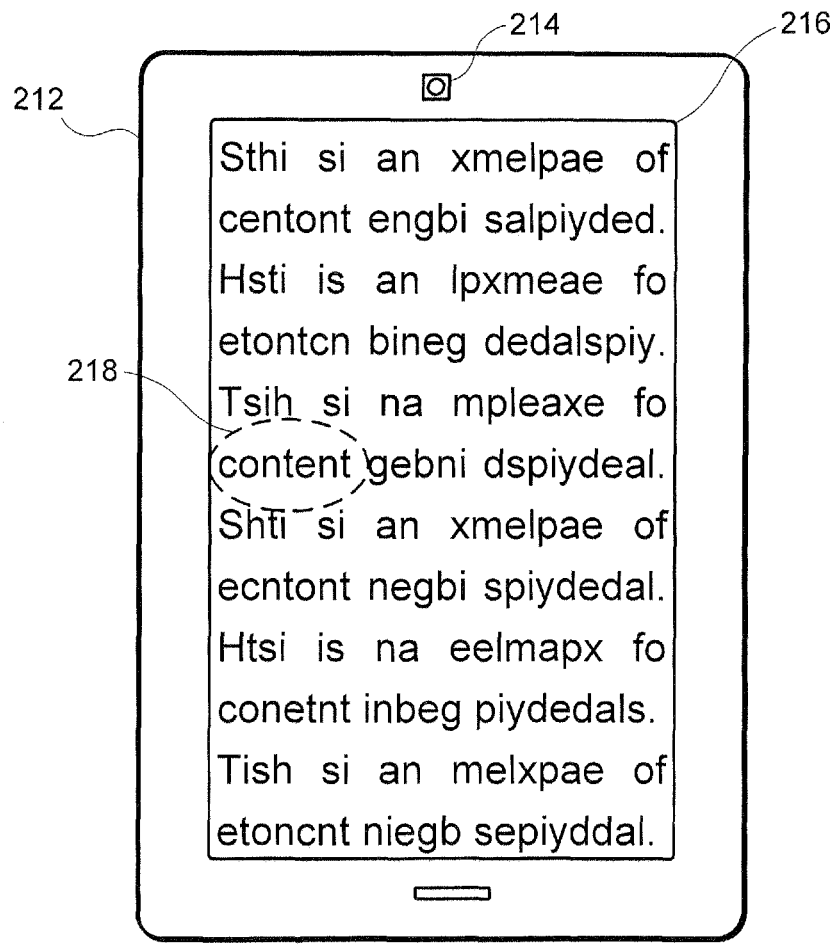
FIG. 2C illustrates the example device embodiment of FIG. 2B for display security for text content using gaze tracking.

FIG. 2C illustrates the example device embodiment 212 of FIG. 2B for display security for text content using gaze tracking. FIG. 2C shows an example of the user's gaze direction having changed/moved and the example computing device embodiment 212 having updated the displaying of the content based on having tracked the changed/moved gaze direction of the user. As shown in FIG. 2C, the position (or area) 218 determined by the device 212 to be corresponding to where the user's gaze is directed has moved from that in FIG. 2B. Accordingly, the example computing device 212 in FIG. 2C has scrambled the content displayed at the previous position (from where the current position 218 moved) and has unscrambled (e.g., made decipherable) the content at the current position 218 corresponding to where the user is currently gazing.

Figure 2D:
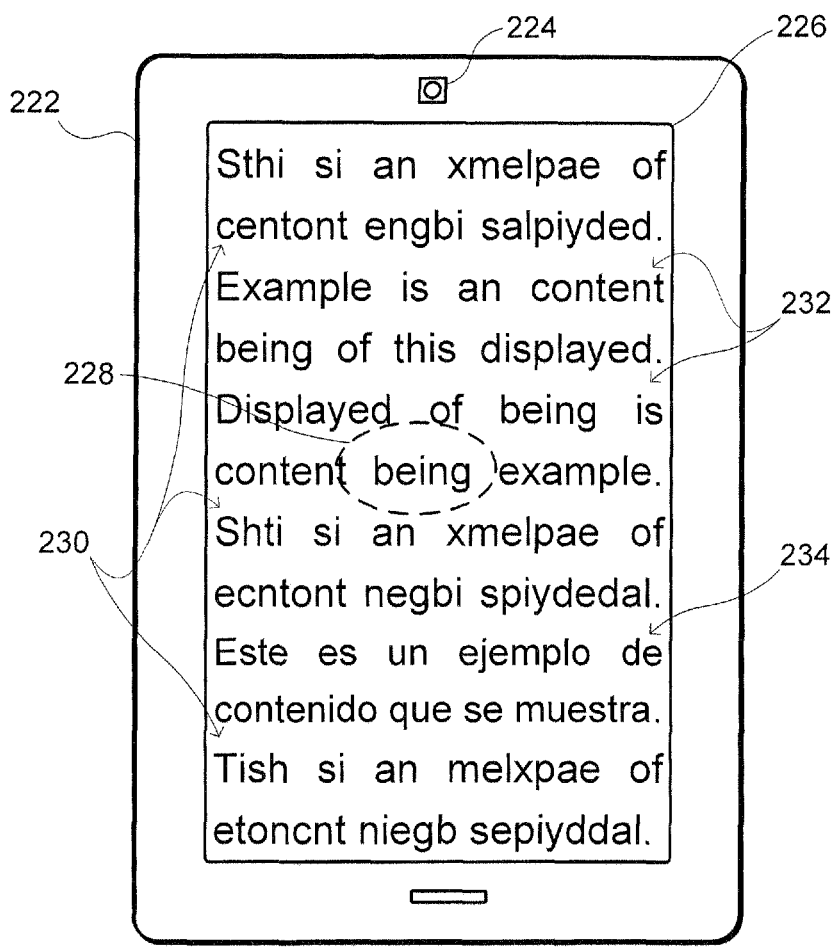
FIG. 2D illustrates an example device embodiment for display security for text content using gaze tracking.

FIG. 2D illustrates an example device embodiment 222 for display security for text content using gaze tracking. The computing device embodiment 222 of FIG. 2D implements some example ways and/or manners in which to scramble content. In one example, at least a portion of content can be scrambled by mixing up letters or characters of each word in the text, as shown at the example content portions 230 (as well as in FIG. 2B and FIG. 2C). In another example, scrambling can be implemented by mixing up the words (or the order of the words in which they appear) included in the text, as shown in the example content portions 232. In a further example, scrambling can be performed by replacing the text to be scrambled with text of a different language, as shown in the example content portion 234. The various implementations of scrambling can be utilized independently or in any combination. It is further contemplated that a person of ordinary skill in the art would recognize various other implements for scrambling content.

Moreover, while various portions of the content are scrambled, the (portion(s) of) content being displayed at the particular position 228 on the display 226 remains unscrambled/decipherable because the position 228 is determined to correspond to the user's gaze direction as tracked using the camera 224.

Figure 3A:
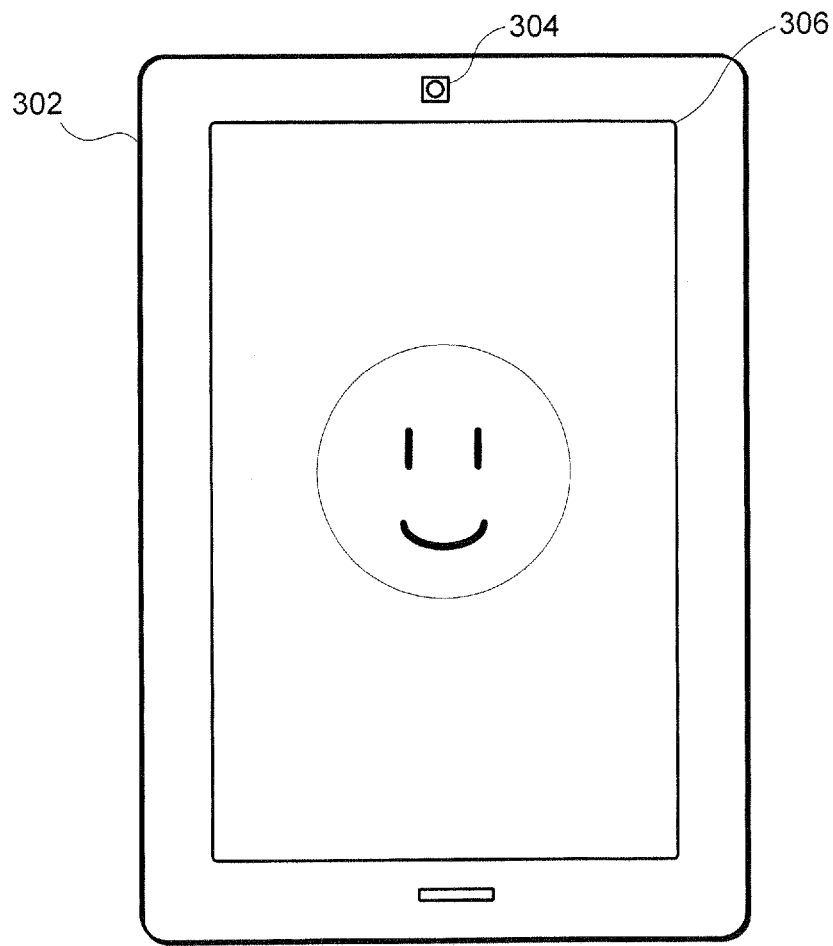
FIG. 3A illustrates an example device embodiment for display security for image content using gaze tracking.

FIG. 3A illustrates an example device embodiment 302 for display security for image content using gaze tracking. As shown in FIG. 3A, the example computing device embodiment 302 can comprise a camera 304 and a display 306. The camera 304 can be configured to facilitate in tracking the gaze direction of a user of the computing device embodiment 302. The display 306 can be configured to display content, such as an image(s).

In FIG. 3A, the example image content as displayed by the computing device 302 can be (readily) decipherable (e.g., understandable, etc.) to the user of the device 302. However, a person other than the user may also be able to see the display 306 and be able to view and decipher the image content. As such, the computing device 302 can implement scrambling (e.g., obscuring, concealing, etc.) with respect to the image content displayed such that the user can still view the content with relative ease but with the reduced likelihood that other people (e.g., unauthorized personnel) would be able to easily view the content, as discussed in more detail with reference to FIG. 3B.

Figure 3B:
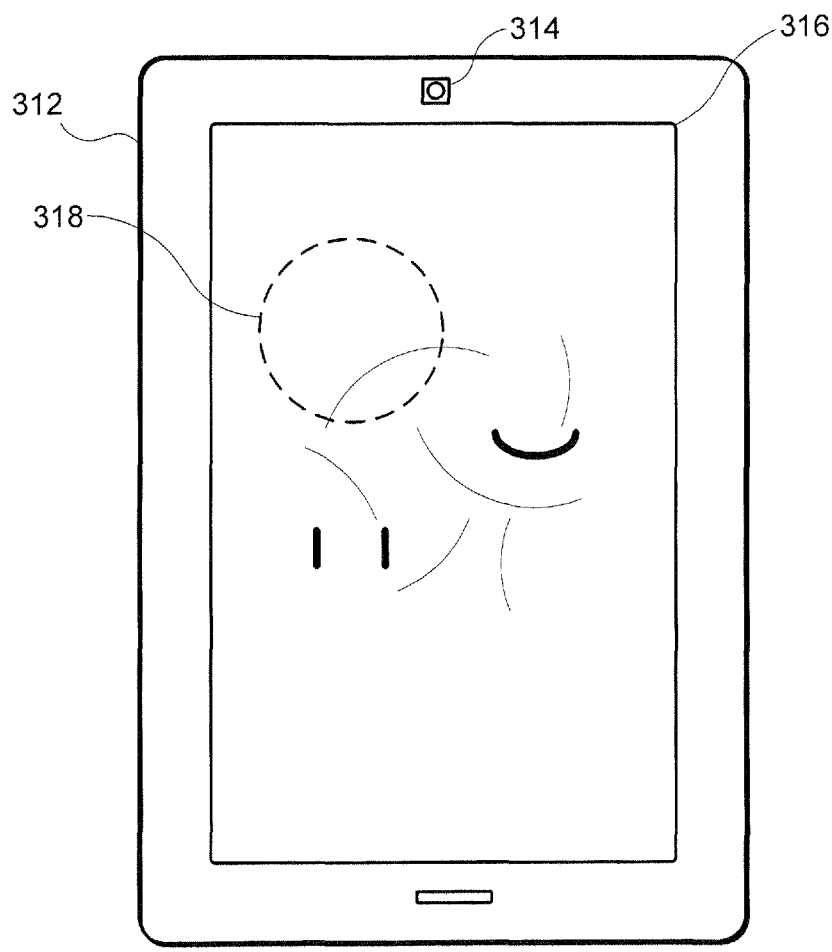
FIG. 3B illustrates an example device embodiment for display security for image content using gaze tracking.

FIG. 3B illustrates an example device embodiment 312 for display security for image content using gaze tracking. As shown in FIG. 3B, the example image content displayed via a display 316 of the example device 312 can be scrambled. In some embodiments, the scrambling of image content can include dividing (e.g., separating) the image content into sub-portions and rearranging the order/layout/arrangement in which the sub-portions are displayed. As such, the image content can become not readily decipherable. When, for example, unauthorized personnel see the image content, the unauthorized personnel will have a more difficult time trying to recognize/understand the image content.

However, the computing device 312 can still allow the user of the device 312 to view and decipher (e.g., understand, recognize, etc.) the image content. In some embodiments, the computing device 312 can use the camera 314 to determine or track the gaze direction of the user. The device 312 can also calculate and/or determine a position or area 318 on the display 316 that corresponds to the user's gaze direction.

In some embodiments, the computing device 312 can display image content that is decipherable (e.g., understandable, recognizable, non-scrambled, etc.) at the position or area 318 on the display 316 corresponding to the user's gaze direction. As the user changes or moves his/her gaze direction relative to the display 316, the device 312 can calculate/determine and update the position or area 318 accordingly, and display content that is decipherable at the (updated) position or area 318.

For example, as shown in FIG. 3B, the device 312 can track the user's gaze and determine that the gaze is directed toward the particular position (or area) 318 on the display 316. The example computing device 312 can display, at position 318, image content that is decipherable while maintaining the scrambling of image content displayed at other positions/areas. In other words, if image content being displayed at a particular position/area on the display 316 is scrambled, then the device 312 can unscramble the image content when the gaze direction of the user is directed to that particular position/area on the display 316. Image content at other positions/areas can remain scrambled.

Figure 3C:
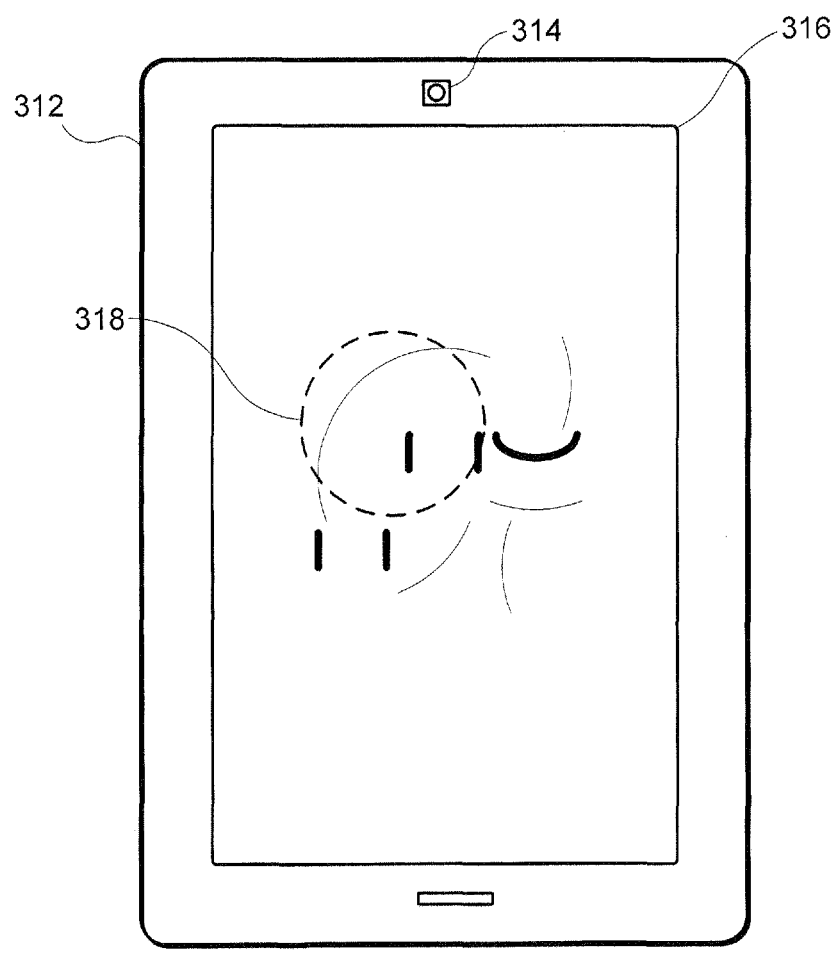
FIG. 3C illustrates the example device embodiment of FIG. 3B for display security for image content using gaze tracking.

FIG. 3C illustrates the example device embodiment 312 of FIG. 3B for display security for image content using gaze tracking. FIG. 3C shows an example of the user's gaze direction having changed/moved and the example computing device embodiment 312 having updated the displaying of the image content based on having tracked the changed/moved gaze direction of the user. As shown in FIG. 3C, the position 318 on the display 316 determined by the device 312 to correspond to where the user's gaze is directed has moved from that in FIG. 3B. As such, the example computing device 312 in FIG. 3C has scrambled the image content displayed at the previous position (from where the current position 318 moved) and has unscrambled (e.g., made decipherable/recognizable) the image content at the current position 318 corresponding to where the user is currently gazing.

Figure 4A:
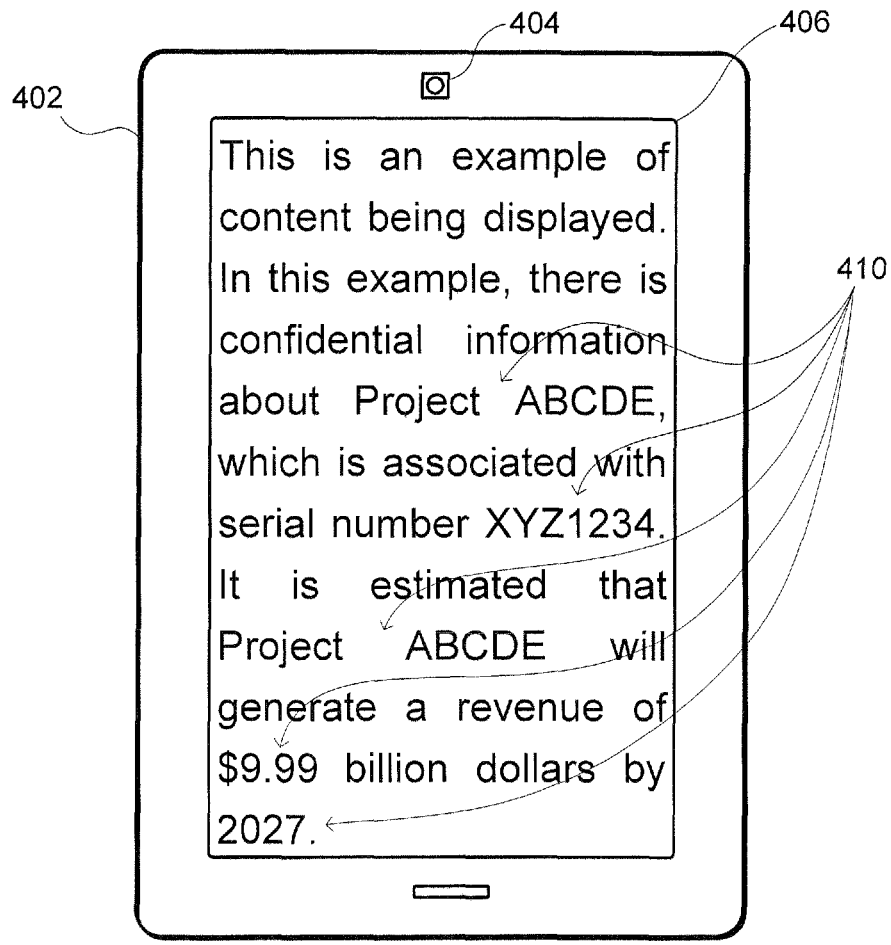
FIG. 4A illustrates an example device embodiment for display security using gaze tracking.

FIG. 4A illustrates an example device embodiment 402 for display security using gaze tracking. The example computing device embodiment 402 can comprise a camera 404 and a display 406. In some embodiments, particular (portions of) content can be scrambled. Particular (portions of) content can be specified/labeled/identified as being private, confidential, or sensitive, etc., material. For example, the user of the device 402 can specify that references to certain words, names, subjects, topics, etc., are to be private, confidential, or sensitive, etc., material. In another example, a document can have information incorporated within the document specifying the portions of the document that are private, confidential, or sensitive, etc. As shown in FIG. 4A, the private, confidential, or sensitive, etc., material can include, for example, project names, serial numbers, financial information, and dates 410. The private, confidential, or sensitive, etc., material (or any other specified portions of the content) can be scrambled, as will be discussed in more detail with reference to FIG. 4B.

Figure 4B:
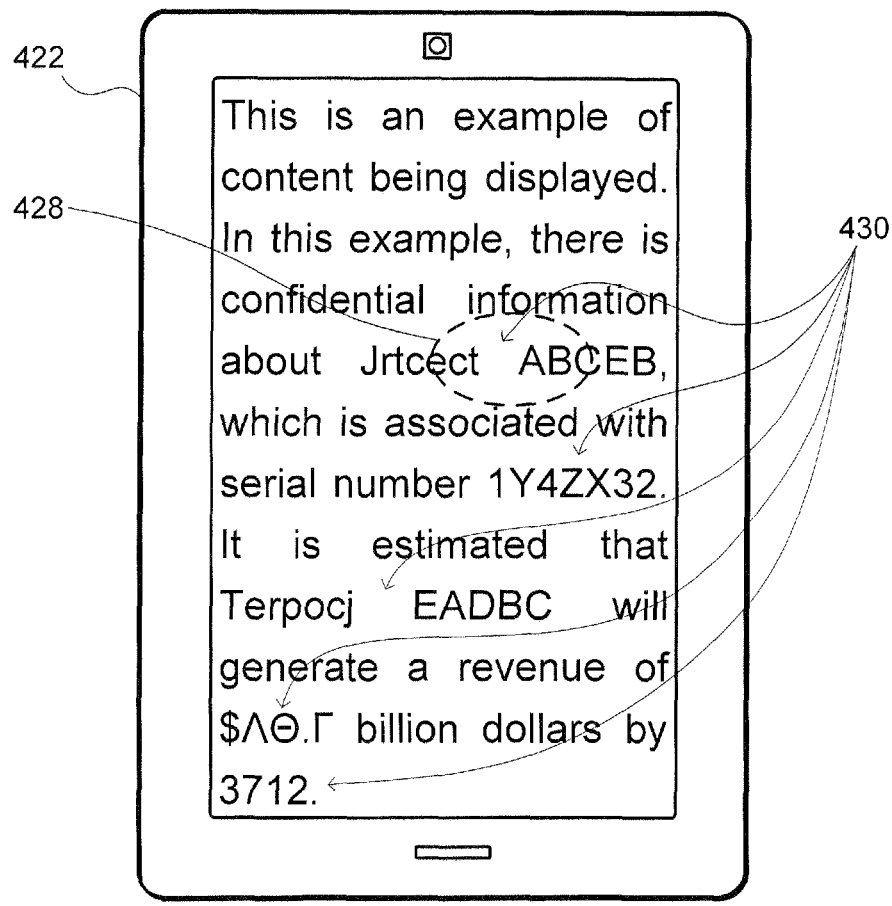
FIG. 4B illustrates an example device embodiment for display security using gaze tracking.

FIG. 4B illustrates an example device embodiment 422 for display security using gaze tracking. The example computing device embodiment 422 can implement scrambling for a particular portion(s) of content. For example, private, confidential, or sensitive, etc., material including project names, serial numbers, financial information, and dates 430 can be scrambled, as shown in FIG. 4B. The computing device 422 can still display content that is decipherable at a position 428 corresponding to the user's gaze.

Figure 5:
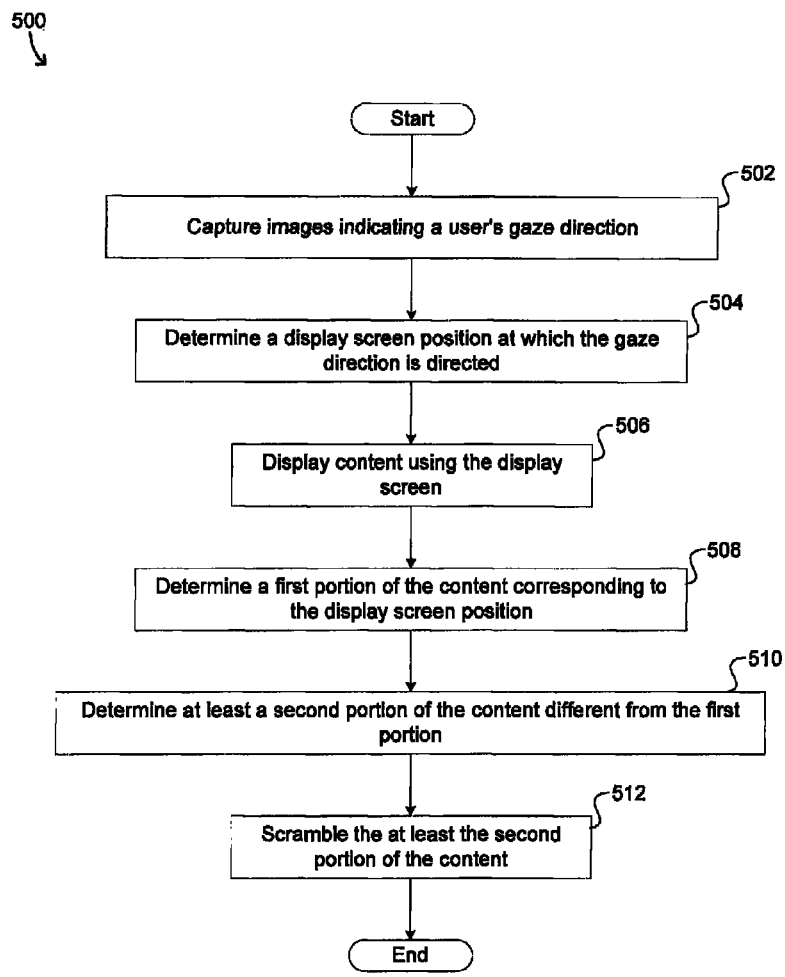
FIG. 5 illustrates an example method embodiment for display security using gaze tracking.

FIG. 5 illustrates an example method embodiment 500 for display security using gaze tracking. It should be understood that there can be additional, fewer, or alternative steps performed in similar or alternative orders, or in parallel, within the scope of the various embodiments unless otherwise stated. The example method embodiment 500 can start with capturing one or more images using a front-facing camera of a computing device, at step 502. The one or more images can indicate a gaze direction of a user of the computing device. At step 504, the example method 500 can determine a position on a display screen of the computing device at which the gaze direction of the user is directed.

Then at step 506, the example method 500 can display content using the display screen of the computing device. Step 508 can include determining a first portion of the content corresponding to the position on the display screen at which the gaze direction of the user is directed. Step 510 can include determining at least a second portion of the content different from the first portion. The method can then scramble the display of at least the second portion of the content, at step 512.

Figure 6:
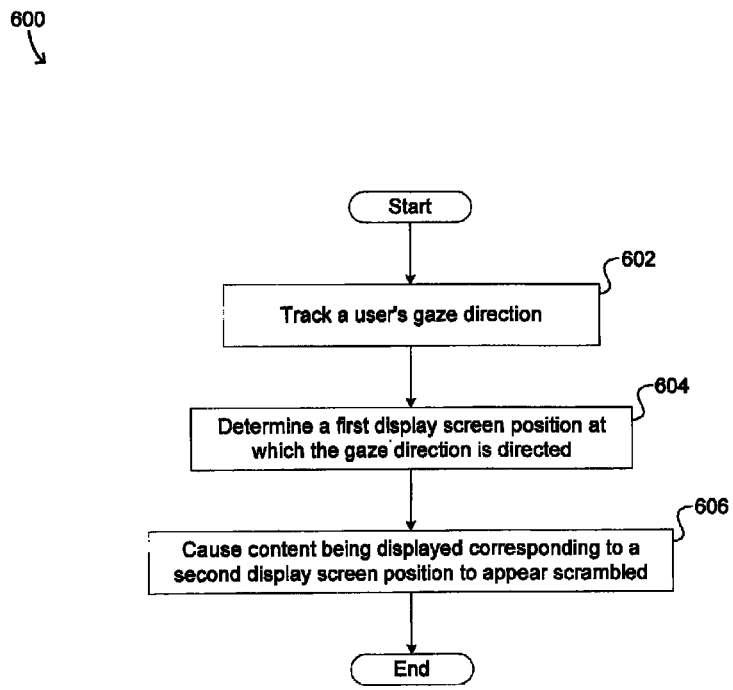
FIG. 6 illustrates an example method embodiment for display security using gaze tracking.

FIG. 6 illustrates an example method embodiment 600 for display security using gaze tracking. Again, it should be understood that there can be additional, fewer, or alternative steps performed in similar or alternative orders, or in parallel, within the scope of the various embodiments unless otherwise stated. At step 602, the example method embodiment 600 can track a gaze direction of a user of a computing device. The tracking the gaze direction can use at least in part a camera of the computing device. At step 604, the example method 600 can determine a first position, with respect to a display of the computing device, at which the gaze direction of the user is directed. Then at step 606, the method 600 can cause content being displayed corresponding to at least a second position with respect to the display to appear scrambled. The at least the second position can be different from the first position.

In some embodiments, the content can be provided by a server connected the computing device via a network environment. In some embodiments, the server can determine which portion(s) of the content should be scrambled and how to scramble the portion(s). In some embodiments, the server can progressively provide information for the content to be displayed on the computing device. For example, the server can provide more data for content being displayed at the screen position corresponding to where the user is gazing, such that the (portion of) content being gazed at is displayed at a higher resolution, whereas the (portion of) content in the surrounding areas is displayed at a lesser resolution.

In some embodiments, the computing device can detect a blink performed by the user. In some embodiments, the computing device can scramble content while the user's eyes are closed during the blink. In some embodiments, the computing device can black out the display screen when the user's eyes are closed during the blink. This can be another layer of display security.

In some embodiments, the computing device can detect a wink (i.e., closing of one eye, while keeping the other eye open) performed by the user. In some embodiments, the computing device can accept a user-initiated instruction based on the closing of the one eye during the wink. The user-initiated instruction can be applied with respect to the gaze position of the other, open eye at the time of the wink. For example, the user-initiated instruction can cause scrambled content corresponding to the gaze direction of the open eye to become unscrambled. In another example, the user-initiated instruction can correspond to a mouse-click (or other similar action) with respect to the screen position at which the open eye is gazing during the wink.

In some embodiments, the computing device can comprise a light emitting diode (LED). The LED can be configured to shine a light at unauthorized personnel when the device detects that there is a sufficient probability that the unauthorized personnel is viewing the display screen of the device. In some embodiments, when the device detects that there is a sufficient probability that unauthorized personnel is viewing the display screen of the device, the screen can be blacked out.

In some embodiments, another layer of display security can involve face recognition. For example, face recognition can be utilized to determine whether or not a user is authorized to view certain content.

Various embodiments consistent with the present disclosure can also be implemented for multiple authorized users. For example, if multiple users are authorized to view content on the computing device, then the computing device can track multiple gazes from the users and unscramble content being displayed at positions corresponding to the multiple gazes from the users.

Figure 7:
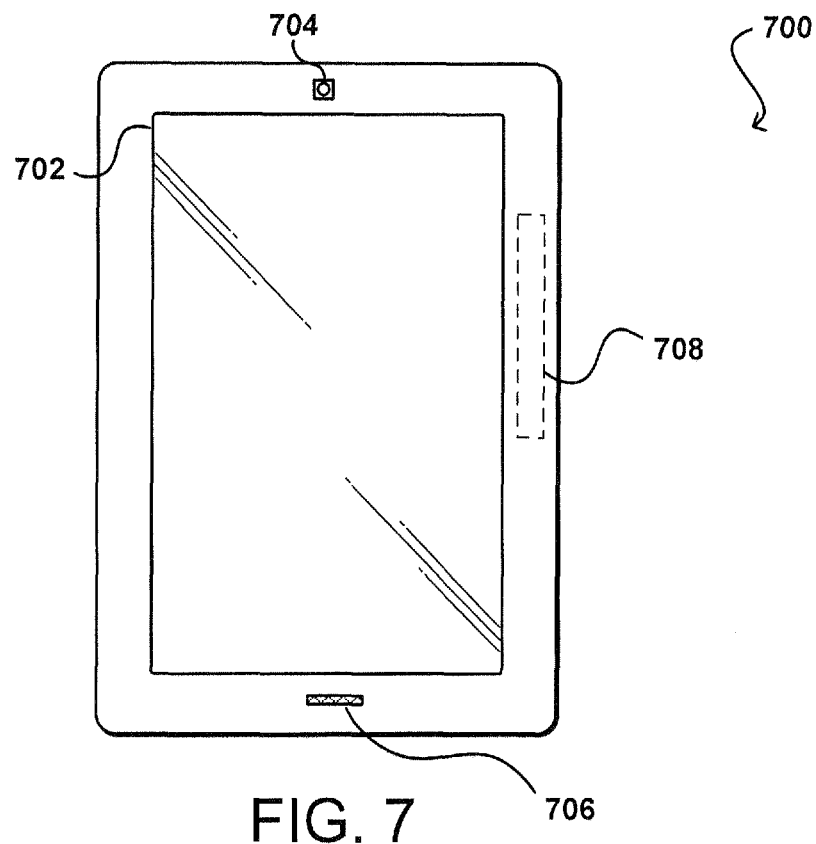
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
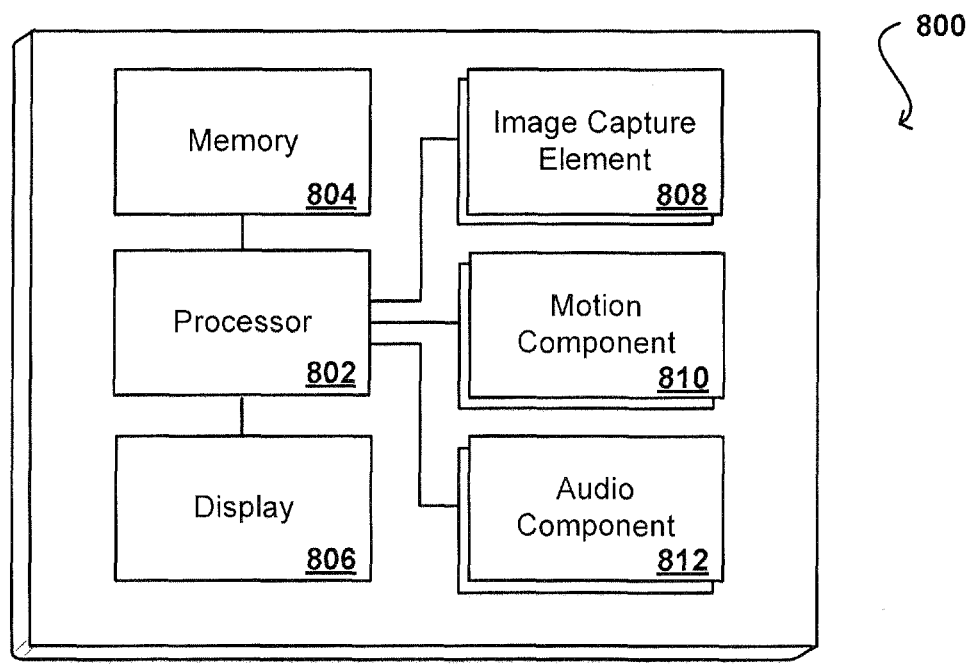
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
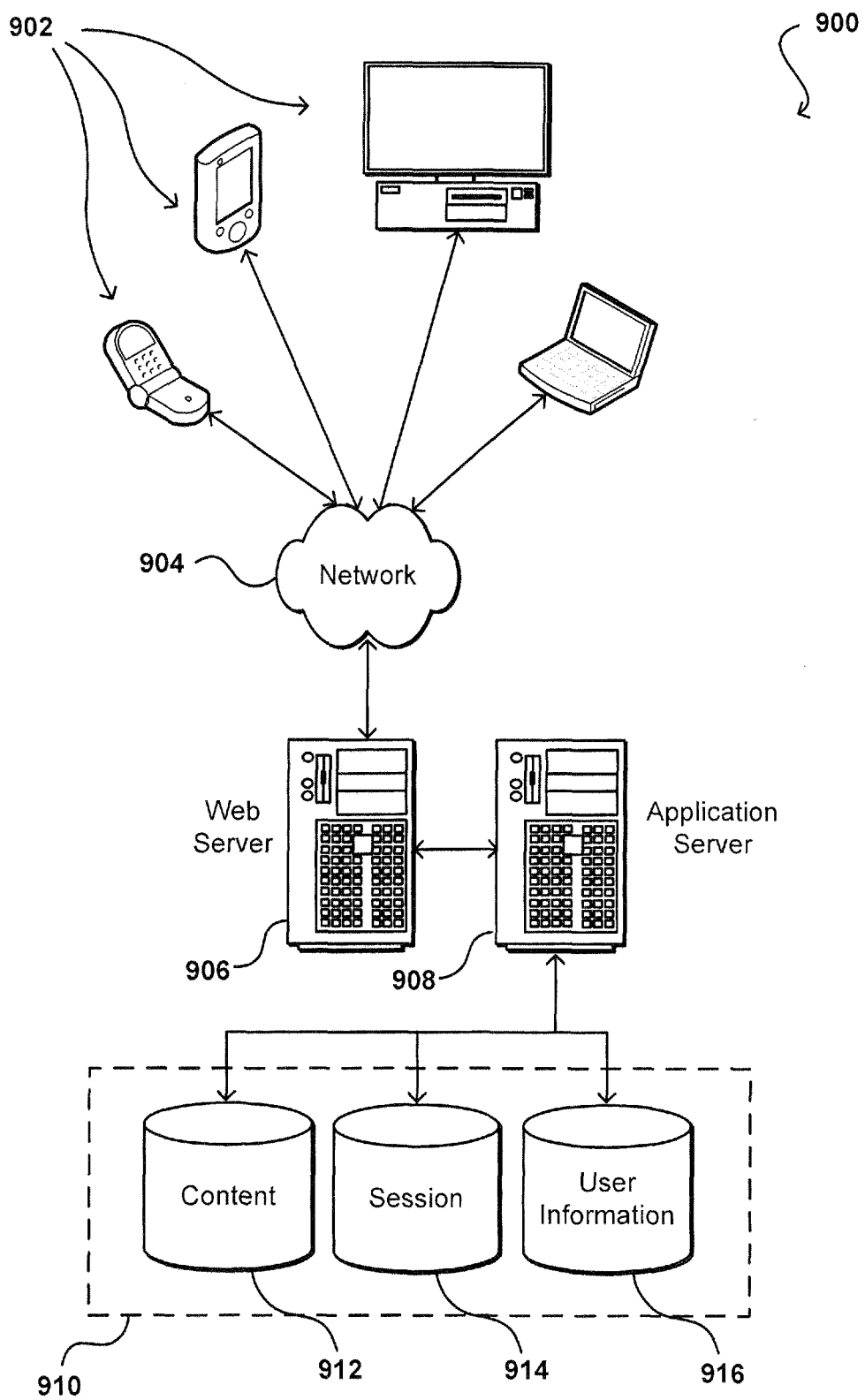
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for providing display security using gaze tracking, comprising:
    capturing one or more images using a front-facing camera of a computing device, the one or more images including a representation of at least one portion of an eye of a user of the computing device;
    detecting a person, different from the user, within a field of view of the front-facing camera;
    determining a gaze direction of the user based at least in part on the representation of the at least one portion of the eye of the user included in the one or more images;
    determining a position on a display screen of the computing device that corresponds to the gaze direction of the user;
    presenting content using the display screen of the computing device;
    determining a first portion of the content being presented at a region within a threshold distance from the position on the display screen corresponding to the gaze direction of the user;
    determining a second portion of the content, different from the first portion, outside of the threshold distance; and
    scrambling at least one portion of the second portion of the content.

2. The computer-implemented method of claim 1, wherein the at least one portion of the second portion of the content comprises text and wherein scrambling the at least one portion of the second portion of the content comprises rearranging at least some characters included in the text.

3. A computer-implemented method for providing display security using gaze tracking, comprising:
    capturing one or more images using a front-facing camera of a computing device, the one or more images including a representation of at least one portion of an eye of a user of the computing device;
    determining a gaze direction of the user based at least in part on the representation of at least one portion of the eye of the user included in the one or more images;
    determining a position on a display screen of the computing device that corresponds to the gaze direction of the user;
    presenting content using the display screen of the computing device;
    determining a first portion of the content being presented at a region within a threshold distance from the position on the display screen corresponding to the gaze direction of the user;
    determining a second portion of the content, different from the first portion, outside of the threshold distance, at least one portion of the second portion of the content comprising a plurality of words; and
    scrambling the at least one portion of the second portion of the content by rearranging an order in which the plurality of words are to be presented.

4. The computer-implemented method of claim 1, wherein the at least one portion of the second portion of the content comprises an image and wherein scrambling the at least one portion of the second portion of the content comprises:
    dividing the image into a plurality of image sub-portions; and
    rearranging an arrangement in which at least some of the image sub-portions are to be presented.

5. A computer-implemented method comprising:
    determining, using at least in part one or more cameras, a gaze direction of a user of a computing device;
    detecting a person, different from the user, within a respective field of view of the one or more cameras;
    determining a view location of the user, with respect to a display of the computing device, based at least in part on the gaze direction; and
    obscuring at least one portion of content, to be presented using the display, at more than a threshold distance from the view location.

6. The computer-implemented method of claim 5, wherein obscuring the at least one portion of the content causes the at least one portion of the content to be more difficult to recognize.

7. The computer-implemented method of claim 5, further comprising:
    detecting, using at least in part the one or more cameras, at least one facial feature belonging to an unauthorized person, the unauthorized person being without permission from the user to view at least one second portion of the content being presented within the threshold distance from the view location;
    determining, based at least in part on detecting the at least one facial feature, that the unauthorized person has a second gaze direction directed at an area on the display within the threshold distance from the view location of the user; and
    obscuring the at least one second portion of the content being presented within the threshold distance from the view location of the user.

8. The computer-implemented method of claim 5, further comprising:
    determining a second gaze direction of an authorized person different from the user, the authorized person having permission from the user to view at least one second portion of the content being presented within the threshold distance from the view location;
    determining a second view location, with respect to the display of the computing device, where the second gaze direction of the authorized person intersects the display; and causing the at least one second portion of the content to be presented within a second threshold distance from the second view location to be unobscured.

9. The computer-implemented method of claim 5, further comprising:
   detecting that the user has closed a first eye and kept open a second eye; and
   applying a user-initiated instruction to the computing device, based at least in part on detecting that the user has closed the first eye, at a position with respect to the display within an allowable distance from a second view location where a second gaze direction of the second eye intersects the display.

10. The computer-implemented method of claim 9, wherein the user-initiated instruction causes at least a second portion of the content, presented at the position with respect to the display within the allowable distance from the second view location, to be unobscured.

11. The computer-implemented method of claim 9, wherein the user-initiated instruction corresponds to at least one of a mouse click or a touch-sensitive tap at the position with respect to the display within the allowable distance from the second view location.

12. The computer-implemented method of claim 5, wherein the at least one portion of the content comprises text, and wherein obscuring the at least one portion of the content comprises rearranging at least some characters included in the text.

13. The computer-implemented method of claim 5, wherein the at least one portion of the content comprises an image, and wherein obscuring the at least one portion of the content comprises:
   dividing the image into a plurality of image sub-portions; and
   rearranging an arrangement in which at least some of the image sub-portions are to be presented.

14. The computer-implemented method of claim 5, wherein obscuring the at least one portion of the content comprises at least one of blurring the at least one portion of the content, distorting the at least one portion of the content, concealing the at least one portion of the content, applying a filter to the at least one portion of the content, applying an image processing algorithm to the at least one portion of the content, or changing a polarization associated with the at least one portion of the content.

15. A computer-implemented method comprising:
   determining a gaze direction of a user of a computing device;
   determining a view location of the user, with respect to a display of the computing device, based at least in part on the gaze direction;
   obscuring at least one portion of content, to be presented using the display, at more than a threshold distance from the view location;
   detecting that eyes of the user are closed; and
   obscuring all of the content being presented using the display to be obscured based at least in part on detecting that the eyes of the user are closed.

16. A computer-implemented method comprising:
   determining a gaze direction of a user of a computing device;
   determining a view location of the user, with respect to a display of the computing device, based at least in part on the gaze direction; and
   obscuring at least one portion of text, to be presented using the display, at more than a threshold distance from the view location, by replacing at least some characters included in the text with at least some specified replacement characters.

17. A computer-implemented method comprising:
   determining a gaze direction of a user of a computing device;
   determining a view location of the user, with respect to a display of the computing device, based at least in part on the gaze direction; and
   obscuring a plurality of words, to be presented using the display, at more than a threshold distance from the view location, by rearranging an order in which the plurality of words are to be presented.

18. A system comprising:
   one or more cameras;
   a display;
   a processor; and
   a memory device including instructions that, upon being executed by the processor, cause the system to:
      determine, using at least in part the one or more cameras, a gaze direction of a user of the system;
      detect a person, different from the user, within a respective field of view of the one or more cameras;
      determine a view location of the user, with respect to the display of the system, based at least in part on the gaze direction; and
      obscure at least one portion of content, to be presented using the display, at more than a threshold distance from the view location.

19. The system of claim 18, further comprising:
   a network server,
   wherein the instructions upon being executed cause the system to further:
      provide, via the network server, the at least one portion of the content, to be presented using the display, at more than the threshold distance from the view location;
      provide, via the network server, at least one second portion of the content, to be presented using the display, within the threshold distance from the view location.

20. The system of claim 18, wherein the instructions upon being executed cause the system to further:
   detect, using at least in part the one or more cameras, at least one facial feature belonging to an unauthorized person, the unauthorized person being without permission from the user to view at least one second portion of the content being presented within the threshold distance from the view location;
   determine, based at least in part on detecting the at least one facial feature, that the unauthorized person has a second gaze direction directed at an area on the display within the threshold distance from the view location of the user; and
   obscure the at least one second portion of the content being presented within the threshold distance from the view location of the user.

21. The system of claim 18, wherein the instructions upon being executed cause the system to further:
   determine a second gaze direction of an authorized person different from the user, the authorized person having permission from the user to view at least one second portion of the content being presented within the threshold distance from the view location;
   determine a second view location, with respect to the display, where the second gaze direction of the authorized person intersects the display; and cause at least one third portion of the content to be presented within a second threshold distance from the second view location to be unobscured.

22. A system comprising:
a camera;
a display;
a light emitter;
a processor; and
a memory device including instructions that, upon being executed by the processor, cause the system to:
determine, using at least in part the camera, a first gaze direction of a user of the system;
determine a first view location of the user, with respect to the display, based at least in part on the first gaze direction; and
obscure at least one first portion of content, to be presented using the display, at more than a threshold distance from the first view location;
determine, using at least in part the camera, a second gaze direction of an unauthorized person not having permission from the user to view at least one second portion of the content within the threshold distance from the first view location;
determine a second view location of the unauthorized person, with respect to the display, based at least in part on the second gaze direction;
determine that the second view location corresponds at least in part to the at least one second portion of the content; and
shine a light at one or more eyes of the unauthorized person using the light emitter.

23. A non-transitory computer-readable storage medium including instructions, the instructions upon being executed by a processor of a computing device causing the computing device to:
determine, using at least in part one or more cameras, a gaze direction of a user of the computing device;
detect a person, different from the user, within a respective field of view of the one or more cameras;
determine a view location of the user, with respect to a display of the computing device, based at least in part on the gaze direction; and
obscure at least one portion of content, to be presented using the display, at more than a threshold distance from the view location.

24. The non-transitory computer-readable storage medium of claim 23, wherein the instructions upon being executed cause the computing device to further:
detect that the user has closed a first eye and kept open a second eye; and
apply a user-initiated instruction to the computing device, based at least in part on a detection of the user closing the first eye, at a position with respect to the display within an allowable distance from a second view location where a second gaze direction of the second eye intersects the display.

25. The non-transitory computer-readable storage medium of claim 24, wherein the user-initiated instruction causes at least one second portion of the content, presented at the position with respect to the display within the allowable distance from the second view location, to be unobscured.

26. The non-transitory computer-readable storage medium of claim 24, wherein the user-initiated instruction corresponds to at least one of a mouse click or a touch-sensitive tap at the position with respect to the display within the allowable distance from the second view location.

* * * * *